US007808971B2

(12) United States Patent
Miller

(10) Patent No.: US 7,808,971 B2
(45) Date of Patent: Oct. 5, 2010

(54) ROUTING CACHE FOR DISTRIBUTED HASH TABLES

(76) Inventor: John L. Miller, 4 College Fields, Cambridge, DF (GB) CB4 1YZ (*) Notice: Subject to any disclaimer, the term of this patent is extended or adjusted under 35 U.S.C. 154(b) by 1334 days.

(21) Appl. No.: 11/172,686

(22) Filed: Jul. 1, 2005

(65) Prior Publication Data

US 2007/0002869 A1    Jan. 4, 2007

(51) Int. Cl.
*H04L 12/28* (2006.01)
*G06F 15/173* (2006.01)

(52) U.S. Cl. .................. 370/351; 370/395.32; 370/400; 709/238

(58) Field of Classification Search ................ 370/351, 370/395.32, 400; 709/238, 243
See application file for complete search history.

(56) References Cited

U.S. PATENT DOCUMENTS

| | | | |
|---|---|---|---|
| 7,263,560 B2 * | 8/2007 | Abdelaziz et al. ........... | 709/238 |
| 2002/0143989 A1 | 10/2002 | Huitema et al. | |
| 2004/0249970 A1 * | 12/2004 | Castro et al. ................ | 709/238 |
| 2008/0310340 A1 * | 12/2008 | Isozu .......................... | 370/328 |

OTHER PUBLICATIONS

Eng Keong Lua, Jon Crowcroft, Marcelo Pias, Ravi Sharma, and Steven Lim, A Survey and Comparison of Peer-to-Peer Overlay Network Schemes, IEEE Communication Survey and Tutorial, Mar. 2004; revised Nov. 2004.

Stephanos Androutsellis-Theotokis and Diomidis Spinellis, A Survey of Peer-to-Peer Content Distribution Technologies, ACM Computing Surveys, 36(4):335-371, Dec. 2004.

Introduction The Beehive System, http://www.cs.cornell.edu/people/egs/beehive/beehive-nsdi04/nodel.html, Feb. 11, 2004.

Ion Stoica, Robert Morris, David Karger, M. Frans Kaashoek, and Hari Balakrishnan, Chord: A Scalable Peer-to-Peer Lookup Service for Internet Applications, SIGCOMM'01, Aug. 27-31, 2001, USA, Copyright 2001 ACM.

Joseph Davies, Todd Manion, Ravi Rao, John Miller, and Xiaohai Zhang, Introduction to Windows Peer-to-Peer Networking, http://www.microsoft.com/technet/prodtechnol/winxppro/deploy/p2pintro.mspx, Published: Jan. 1, 2003, Updated: Jul. 30, 2004.

Marvin Theimer and Michael B. Jones, Overlook: Scalable Name Service on an Overlay Network, Apr. 2002, Proceedings of the 22$^{nd}$ International Conference on Distributed Computing Systems, Vienna, Austria, IEEE Computer Society, Jul. 2002.

Antony Rowstron and Peter Druschel, Pastry: Scalable, decentralized object location and routing for large-scale peer-to-peer systems, Proceedings of the 18$^{th}$ IFIP/ACM International Conference on Distributed Systems Plat forms (Middleware 2001). Heidelberg, Germany, Nov. 2001.

(Continued)

*Primary Examiner*—Nittaya Juntima

(57) ABSTRACT

In a distributed hash table (DHT), a participating node has a routing cache associating nodes in the DHT with their respective network addresses. Messages can be routed with the routing table using prefix-matching or numerical-closeness without requiring rigid structuring of the node's cache. Entries in the cache may be replaced using routing information obtained from en route messages. Entries in the routing cache may be replaced without regard for the nodeIDs in or entering the routing cache, and/or without structuring the routing cache according to the nodeIDs placed therein. Cache entries may be replaced randomly.

18 Claims, 13 Drawing Sheets

OTHER PUBLICATIONS

Karl Aberer, Anwitaman Datta, and Manfred Hauswirth, Route maintenance overheads in DHT overlays, EFPL Technical Report IC/2003/67.

Gurmeet Singh Manku, Routing Networks for Distributed Hash Tables, PODC'03, Jul. 13-16, 2003, USA. Copyright 2003 ACM.

Ben Y. Zhao, John Kubiatowicz, and Anthony D. Joseph, Tapestry: An Infrastructure for Fault-tolerant Wide-area Location and Routing, Computer Science Division University of California, Report No. UCB/CSD01-1141 Apr. 2001.

Nima Sarshar and Vwani Roychowdhury, A Random Structure for Optimum Cache Size Distributed Hash Table (DHT) Peer-to-Peer Design, Department of Electrical Engineering, University of California, Oct. 14, 2004, USA.

Himabindu Pucha, Saumitra M. Das, and Y. Charlie Hu, Ekta: An Efficient DHT Substrate for Distributed Applications in Mobile Ad Hoc Networks, In Proceedings of the $6^{th}$ IEEE Workshop on Mobile computing Systems and Applications (WMCSA 2004), UK, Dec. 2-3, 2004.

Sitaram Lyer, Antony Rowstron, and Peter Druschel, Squirrel: A decentralized peer-to-peer web cache, PODC-21 Jul. 2002 USA, © 2002 ACM.

Dahlia Malhi, Moni Naor, and David Ratajczak, Viceroy: A Scalable and Dynamic Emulation of the Butterfly, PODC 2002, Jul. 21-24, 2002, USA, Copyright 2002 ACM.

Jussi Kangasharju, Keith W. Ross, and David A. Turner, "Adaptive content management in structured P2P communities", ACM International Conference Proceeding Series; vol. 152 archive, Proceedings of the 1st International Conference on Scalable Information Systems 2006, Hong Kong May 30-Jun. 1, 2006.

Miguel Castro, Manuel Costa, and Antony Rowstron, "Debunking some myths about structured and unstructured overlays", Proceedings of the 2nd conference on Symposium on Networked Systems Design & Implementation—vol. 2, May 2-4, 2005.

Ferreira, R.A. et al., "An IP address based caching scheme for peer-to-peer networks", Global Telecommunications Conference, 2003. GLOBECOM '03. IEEE, vol. 7, pp. 3845-3850; Dec. 1-5, 2003.

Sarshar, N. et al., "Percolation search in power law networks: making unstructured peer-to-peer networks scalable", Proceedings of the Fourth International Conference on Peer-to-Peer Computing, 2004; pp. 2-9; Aug. 25-27, 2004.

Bogdan Carbunar, Ananth Grama, and Jan Vitek, "Distributed and Dynamic Voronoi Overlays for Coverage Detection and Distributed Hash Tables in Ad-Hoc Networks", Proceedings of the Parallel and Distributed Systems, Tenth International Conference 2004; Jul. 7-9, 2004.

N. Ambastha, I. et al.,"A cache-based resource location approach for unstructured P2P network architectures," In Graduate Research Conference, Department of Computer Science, Stony Brook University; May 2003.

Hung-Chang Hsiao et al., "Resource Discovery in Peer-to-Peer Infrastructure," In the book of "High Performance Computing: Paradigm and Infrastructure", John Wiley & Sons Ltd, Nov. 2005, pp. 551-572.

Stefan Saroiu, P. Krishna Gummadi, and Steven D. Gribble, "A Measurement Study of Peer-to-Peer File Sharing Systems", Proceedings of the Multimedia Computing and Networking (MMCN), San Jose, Jan. 18-25, 2002.

* cited by examiner

260

| Table Size | Success Rate | Average Hops |
|---|---|---|
| 10 | 23.54% | 9.3 |
| 15 | 58.79% | 8.2 |
| 20 | 93.48% | 6.7 |
| 25 | 99.04% | 5.3 |
| 30 | 99.69% | 4.6 |
| 35 | 99.80% | 4.1 |
| 40 | 99.82% | 3.8 |
| 45 | 99.82% | 3.6 |
| 50 | 99.82% | 3.4 |
| 100 | 99.80% | 2.7 |

FIG. 13

ROUTING CACHE FOR DISTRIBUTED HASH TABLES

BACKGROUND

FIG. 1 shows an example of a distributed hash table (DHT) 50. A distributed hash table is a distributed table of key-to-value mappings stored piecewise in a cloud or network of participating nodes. A node may be any type of computing device. A key (such as example key 60) is an identifier, usually numeric, in a large space and is intended to be associated with a node or piece of data such as a value. Multiple key-to-value mappings are possible. For instance, in some DHT implementations there can be 8 different pieces of data with the key "10". A value is unconstrained data intended to be referenced by a key. A value (such as example value 62) can be anything such as an arbitrary string, a network address, a large blob of data, etc. A DHT has functionality much like that of a simple unitary hash table. For instance a DHT will usually have functionality for inserting key-value pairings and looking up keys to find their values. However, with a DHT the DHT's nodes cooperate to maintain the key-to-value mappings and to provide the hash table functionality. Although FIG. 1 shows a hash table 51, the hash table 51 is actually distributed among nodes 54; portions 52 of key-to-value mappings are maintained in nodes 54. For instance, the top node 54 in FIG. 1 stores a portion 52 comprised of keys key1 through key4 and respective values value1 through value4.

FIG. 2 shows a data network 70 with DHT nodes 54. Each DHT node 54 of a DHT may be capable of network-level communication with the other nodes, however, a node 54 may or may not know the network address of a node that is storing a particular key and its value, depending on the contents of its local routing cache. Each node maintains routing information (e.g., a routing cache, discussed later) that it uses to route or forward messages, such as key lookup messages, to other nodes that may either know the key's values or that may use their own routing information to forward the messages to other nodes (usually closer to the target node), and so on. A routing cache may have one or several hundred entries, while the DHT may have any number of nodes. A popular Peer Name Resolution Protocol (PNRP) network could have hundreds of millions of nodes, theoretically limited by its arbitrary key size to $2^{128}$. Other DHTs such as Pastry have keys of arbitrary length with an arbitrary number of nodes. Nonetheless, if a DHT node needs the value of a key it will send a message with the key to another DHT node selected from its routing cache. If the receiving DHT node has the key's value then it will return the same to the requesting DHT node. If the receiving DHT node does not have the key's value then it will select from its routing cache yet another DHT node—usually closer to the target DHT node—and it will forward the message to that node. This process may be repeated until the message reaches the node that has the requested key.

As mentioned above, each DHT node has a routing cache. FIG. 3 shows a configuration of a node 54 with a routing cache 90. Each node in a DHT is usually assigned a unique node identifier (nodeID) which can be mapped into the key space. NodeIDs may be assigned randomly or by other means. The routing cache 90 stores pairings of nodeIDs and corresponding network addresses. A network address is defined herein to mean a node's address on a data network and may be in the form of a numerical address (e.g., an IP address), or a hostname that can be resolved to a numerical address, or other information that one node can use to direct communications via a data network to another node.

The node 54 in FIG. 3 also has an application 94 that interfaces with the DHT. The application 94 may provide or invoke a lookup function, for example lookup(key), which returns a value. The application 94 may also provide or invoke an insertion function, for example insert(key, value). Because lookups, insertions, deletions, etc. are similarly routed in a DHT, routing will be discussed with reference to a generic DHT message. The application 94 may request or lookup a key. The looked up key may either be a target nodeID or may be mapped to a target nodeID. A logic or routing module 96 may respond to a lookup (or insert) request by first checking to see if the key or target nodeID is stored in node 54's local portion 52 of the DHT. If the target nodeID or key is not stored locally in DHT portion 52 then the routing module 96 usually obtains from the routing cache 90 a nodeID (and its network address) that is numerically closest to the target nodeID. There are occasional exceptions to this numerically closest routing approach. For security reasons, some DHTs can forward messages to a sub-optimal next-hop. And some DHTs, such as those implementing the PNRP, can temporarily forward messages away from the target or destination rather than towards it.

After selecting or obtaining the next-hop nodeID, the node 54 then forwards the lookup request via the network 70 to the node of the selected nodeID using that node's network address in node 54's routing cache 90. Most DHT implementations measure numerical closeness by prefix matching. That is to say, a node will select from its routing cache a nodeID with a longest prefix that matches a prefix of the target nodeID. The result is that a request message is routed to nodes with nodeIDs increasingly closer to (and eventually equal to) the target nodeID. For example, a message targeted to nodeID 1243 may follow a route such as: 1876→1259→1247→1243.

FIG. 4 shows a simple cloud or overlay network 100 formed by nodes 54 linked by their respective routing tables 90. The topology of overlay network 100 is determined by the contents of the routing tables in its nodes 54. In practice, the overlay network 100 may have any number of nodes 54.

The discussion above assumes the existence of routing caches or tables in DHT nodes. In reality, nodes build up and manage their routing tables in view of a number of objectives and constraints. Routing tables have been constrained to a small size relative to the number of nodes in a DHT. Routing tables have been populated and maintained according to structural or organizational rules designed to create highly structured overlay networks that facilitate efficient routing of request messages; the topology of an overlay network reflects the nodeIDs selected for inclusion in the routing tables of the participating nodes. Some routing maintenance techniques have favored popular keys, efficient replication, etc. Some DHT implementations have structured their routing tables with the goal of guarantying that requests are routed on the order of log(N) hops, where N is the number of nodes. These aims and constraints can be cumbersome and unreliable. Consider FIGS. 5 and 6.

FIG. 5 shows a structured routing table 110 with entries 112. The network addresses accompanying the entries 112 are not shown. The routing table 110 is populated and maintained such that there are entries 112 for nodeIDs with each sub-prefix of the hosting node's nodeID. Assuming that nodeIDs have a radix of 10, and assuming that the nodeID 114 of routing table 110's host node is 37124, then the routing table 110 is provided with levels of nodeIDs with increasingly longer prefixes that match 37124 (an "x" in an entry 112 indicates that the rest of the nodeID is unconstrained and can be any digit). Maintaining this kind of structure can be difficult, particularly when nodes frequently join and depart a DHT.

FIG. 6 shows a message route. In overlay network 100, node 42134 requests the value for key 35027. Node 42134 sends a request to node 37124. Assuming that node 37124 has the routing table 110 shown in FIG. 5, node 37124 refers to routing table 110 and determines that the entry at Level2, row 6 has the nodeID (35236) that is numerically closest to key 35027. Node 37124 refers to its routing table and accordingly forwards the request to node 35236 (which matches prefix "35"). The request is similarly forwarded by node 35236 and others until the request reaches node 35027, which is responsible for storing the key-value pair for key 35027. Incidentally, the filled request may traverse back along the same route to requesting node 54.

In sum, implementations of DHT routing tables have resulted in complex code with high overhead and low reliability.

SUMMARY

The following summary is included only to introduce some concepts discussed in the Detailed Description below. This summary is not comprehensive and is not intended to delineate the scope of protectable subject matter, which is set forth by the claims presented below.

In a distributed hash table (DHT), a participating node has a routing cache associating nodes in the DHT with their respective network addresses. Messages can be routed with the routing table using prefix-matching or numerical-closeness without requiring rigid structuring of the node's cache. Entries in the cache may be replaced using routing information obtained from en route messages. Entries in the routing cache may be replaced without regard for the nodeIDs in or entering the routing cache, and/or without structuring the routing cache according to the nodeIDs placed therein. Cache entries may be replaced randomly.

Many of the attendant features will be more readily appreciated by referring to the following detailed description considered in connection with the accompanying drawings.

DESCRIPTION OF THE DRAWINGS

Like reference numerals are used to designate like parts in the accompanying Drawings.

FIG. 13 shows some test results.

DETAILED DESCRIPTION

A DHT Message

Figure 7:
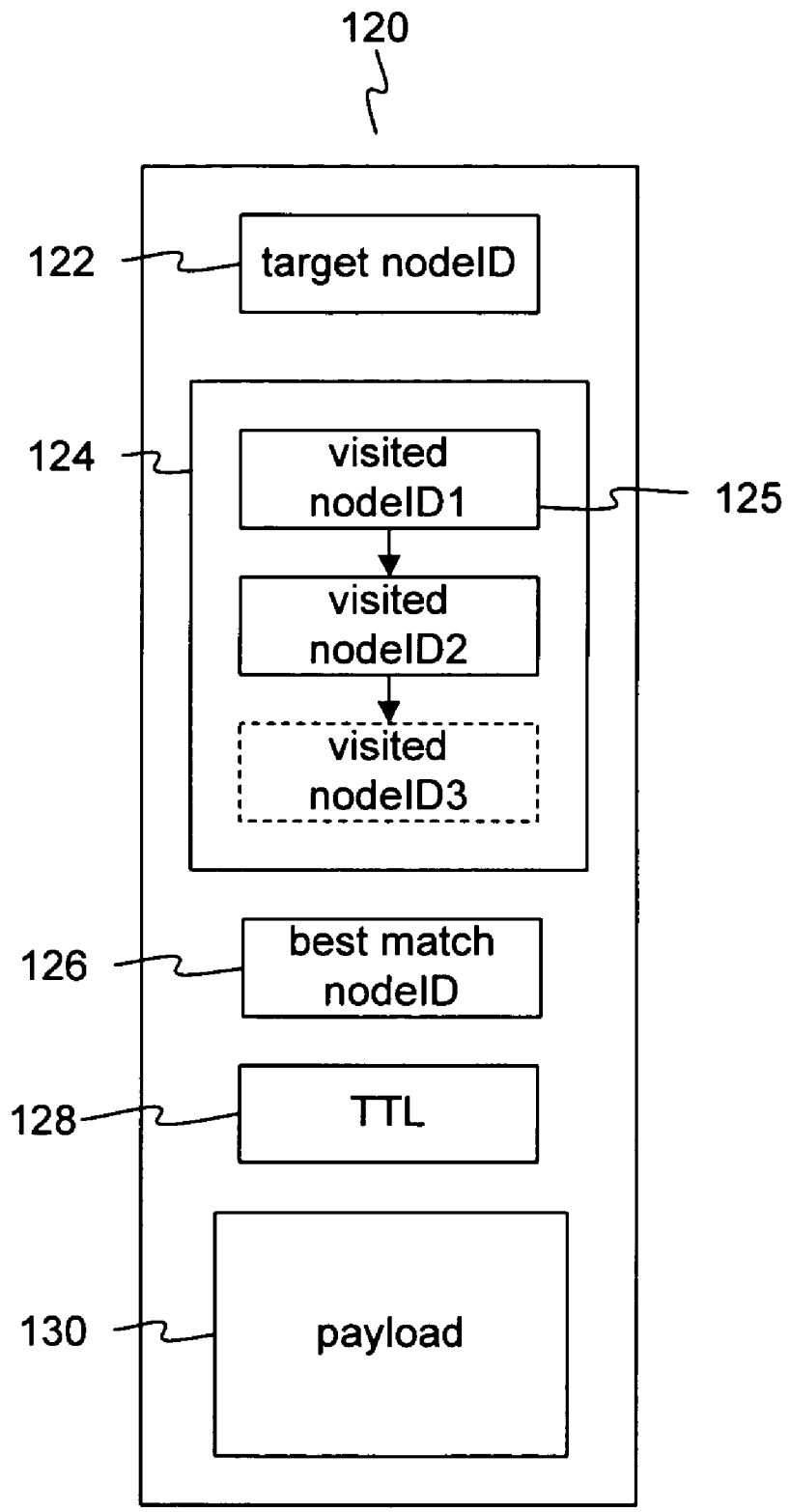
FIG. 7 shows an example of an en route DHT message.

FIG. 7 shows an example of an en route DHT message 120. The same type of message 120 may be used for any type of request that may need to be routed in the DHT, such as a key lookup request, a key insertion request, etc. The message 120 will carry a target nodeID 122 as it is routed from one node to the next toward the target node. That is, the target nodeID 122 is the nodeID or key to which the message 120 should be routed. The target nodeID may be a key itself, or it may be mapped to a key when the message 120 is generated. The message 120 may have a message path 124, which is a list of nodes 125 through which the message 120 has been routed; each node appends its nodeID-address when forwarding the message 120 and removes its nodeID-address when returning the message 120 after it has been delivered. The message path 124 enables back-tracking and return-routing of the message 120 after delivery to the target node.

A best match nodeID 126 may also be included. The best match nodeID 126 is a nodeID-address pair which, at any point along the route of the message 120, identifies the node in the message path 124 whose nodeID most closely matches the target nodeID 122. The best match nodeID 126 may be a pointer to an entry in the message path 124. Inclusion of a best match nodeID 126 may be useful in some routing algorithm embodiments (see FIG. 12).

A time-to-live (TTL) field 128 may be used to track how many more hops are allowed for the message 120. The TTL field 128 starts with a fixed value when the message 120 is generated and is decremented each time the message 120 passes through a node. The TTL field 128 may be used to prevent message 120 from propagating indefinitely through the DHT cloud in pathological cases; a node handling the message 120 may kill the message 120 if it detects that the TTL field 128 has reached zero. The message 120 may also have a payload field 130 to return a looked up value. If message 120 is intended to find the network address of the target nodeID 122, then the payload field 130 may be nulled or omitted.

Routing Cache

Figure 1:
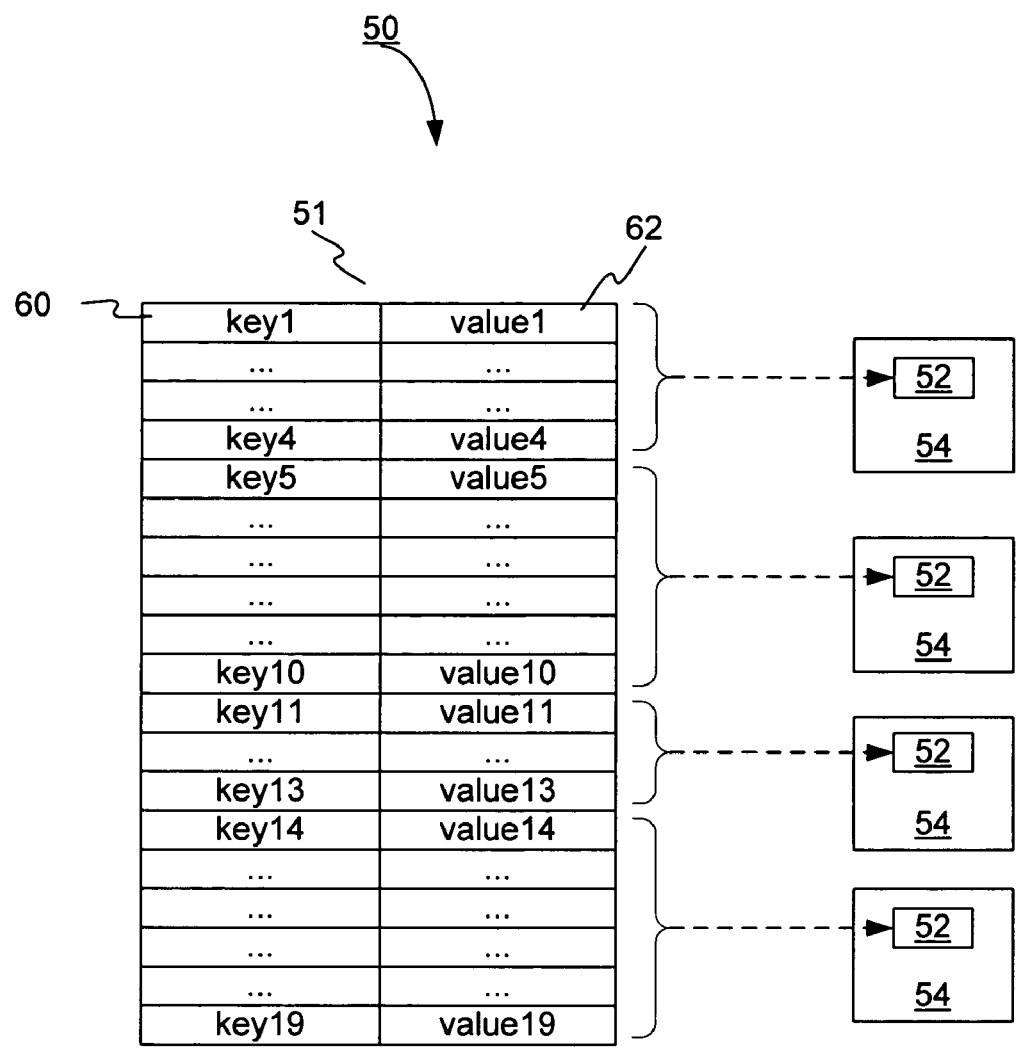
FIG. 1 shows an example of a distributed hash table (DHT).
Figure 2:
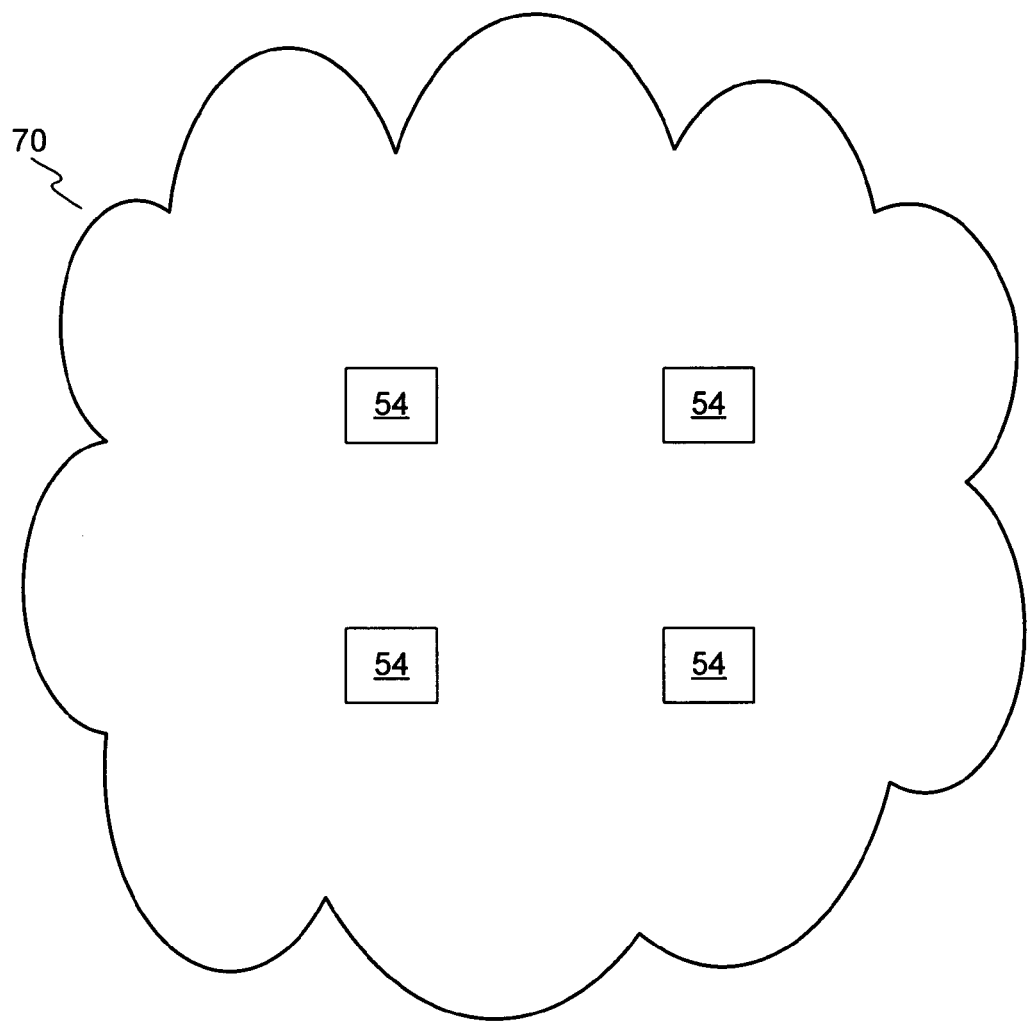
FIG. 2 shows a data network with DHT nodes.
Figure 3:
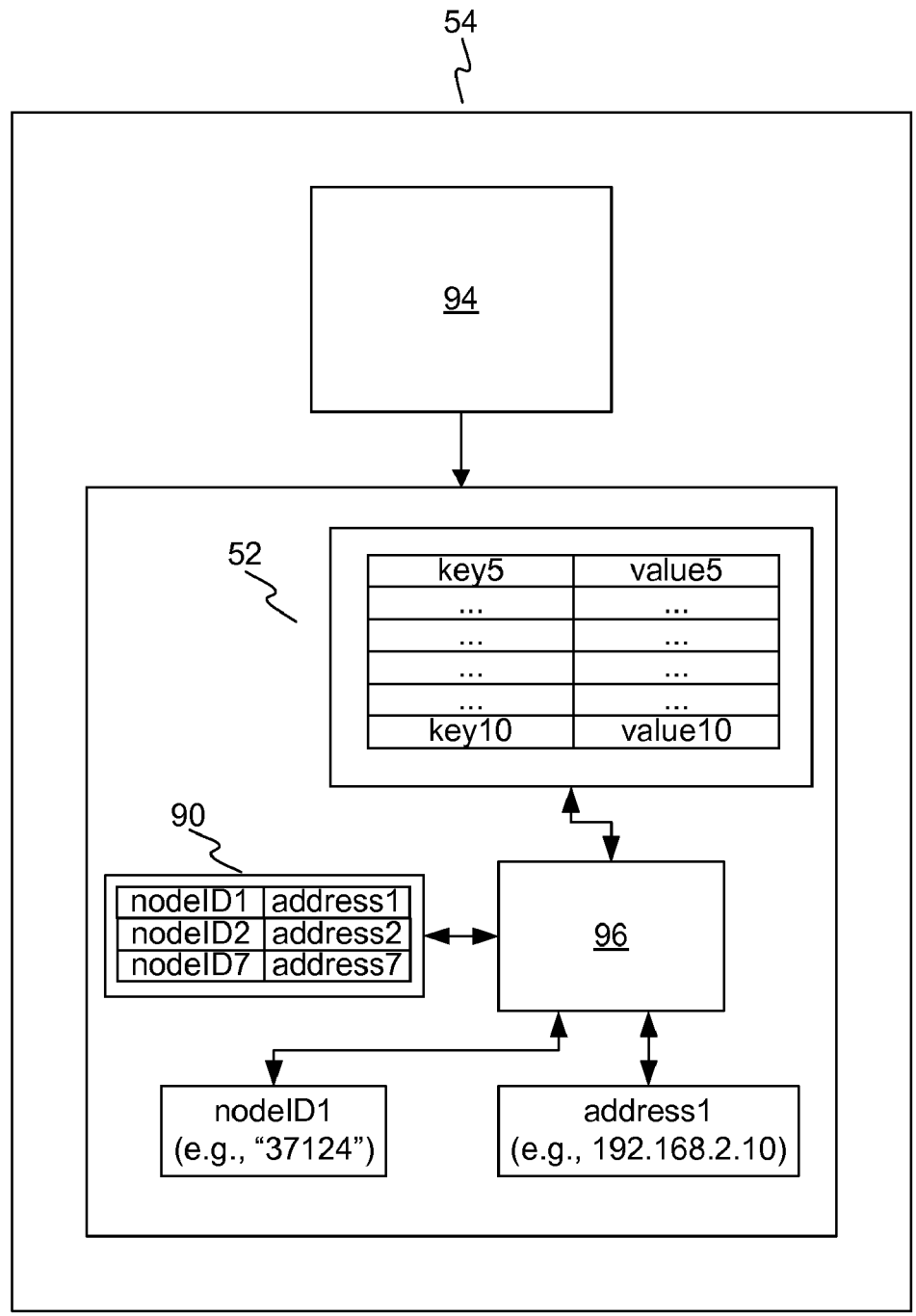
FIG. 3 shows a configuration of a node with a routing cache.
Figure 4:
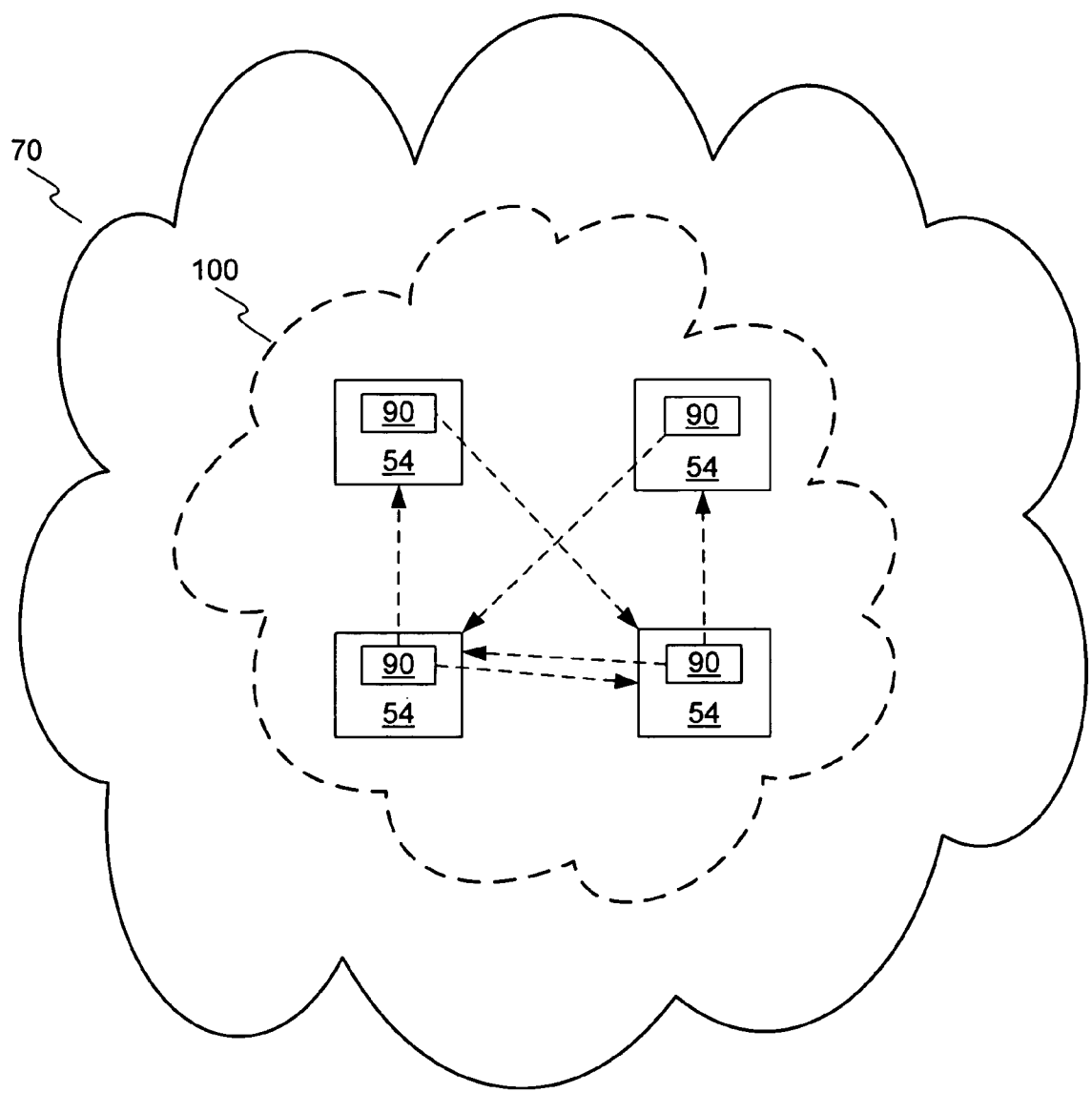
FIG. 4 shows a cloud or overlay network formed by nodes linked by their respective routing tables.
Figure 8:
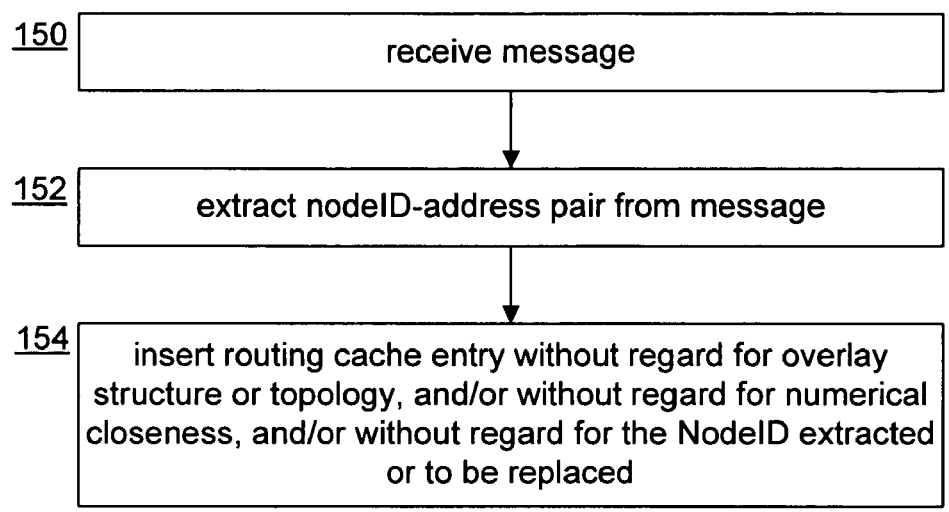
FIG. 8 shows a process for maintaining a DHT routing cache.

FIG. 8 shows a process for maintaining a DHT routing cache. As mentioned in the Background, a DHT node will have a routing cache. The process of FIG. 8 relates to building and/or maintaining the routing cache of a DHT node. A node performing the process of FIG. 8 may be configured similarly to the node 54 in FIG. 3; however the routing module 96 may operate as follows. First, an incoming message is received 150. The message is a generic message and may be intended for a lookup, an insertion, a deletion, etc. within the subject DHT. The received 150 message may be originated by the node performing the process of FIG. 8 or it may be received from another node. A nodeID-address pair is extracted 152 from the message. The extracted 152 nodeID-address pair may be an element node 125 extracted from a path list 124. However, any preferably fresh nodeID-address pairing may be extracted 152. For example, a node that previously forwarded the message may have added to the message a select or arbitrary nodeID-address pairing obtained from its routing table, preferably a pairing that is not likely to be stale. The current node then replaces or inserts 154 an entry in its routing cache without regard for overlay structure or topology, and/or without regard for numerical closeness, and/or without regard for the nodeID extracted or to be replaced.

Figure 5:
FIG. 5 shows a structured routing table with entries.
Figure 6:
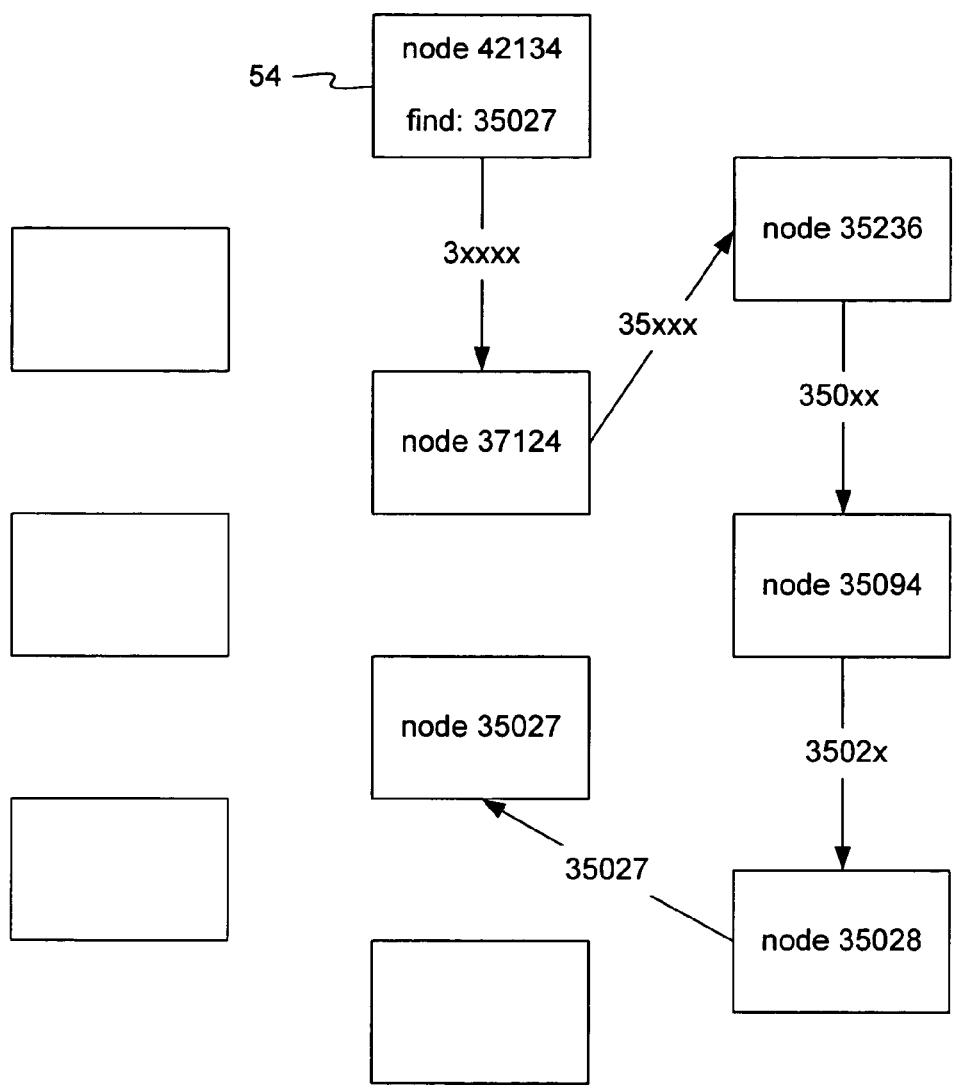
FIG. 6 shows a message route.

In one embodiment the insertion 154 may be performed in any number of ways where the nodeIDs within or entering the routing cache are not used as a basis for structuring the routing cache. With respect to nodeIDs the resulting routing cache may be unstructured after multiple replacements or insertions 154. If entries in the routing cache are replaced or inserted 154 randomly, the resulting routing cache may end up with a random distribution of nodeIDs. Using random replacements substantially all entries in the routing cache will be candidates for replacement. Furthermore, a node using a routing cache built and maintained as discussed above will route most of its messages based on a substantially unstructured or random cache space. In other words, the routing cache is substantially unstructured and is not the same as a routing cache that is structured around nodeID values (e.g., levels as in FIG. 5) regardless of how entries in a level are selected for replacement. Although a routing cache may take on some implicit structure due to the message routing algorithm, such structure would be incidental rather than intentional. Consider that a message with a "best match" or target whose first five digits match the local ID may be just as likely as one which only matches one digit.

Figure 9:
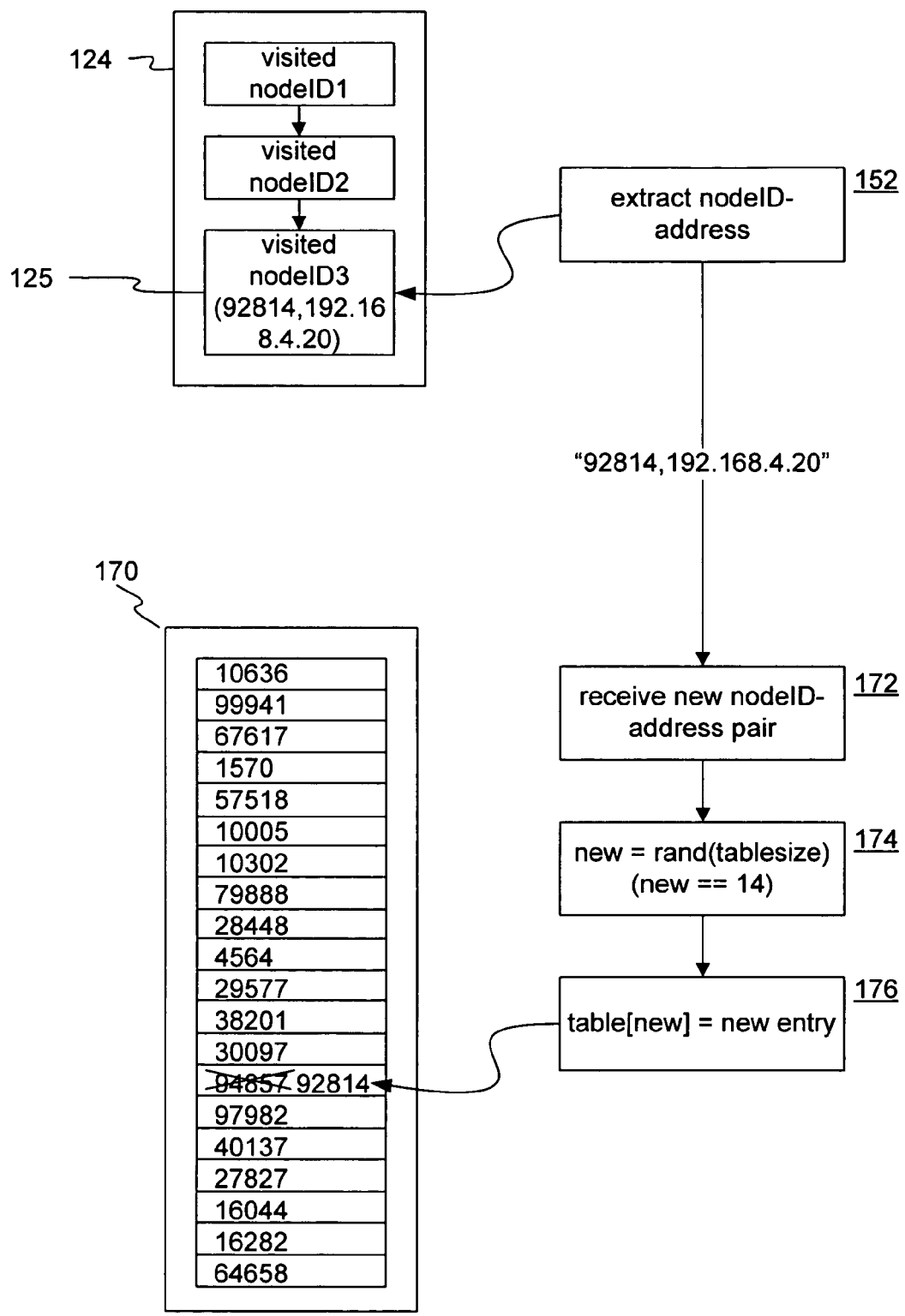
FIG. 9 shows an example of updating a routing cache.

FIG. 9 shows an example of updating a routing cache 170. A path list 124 of a message (now shown) received by a node again provides a new entry for routing cache 170. A nodeID-address pair—"92814,192.168.4.20"—is extracted 152 by the receiving host node and passed to the node's cache manager (not shown). The cache manager receives 172 the new nodeID-address pair. A random number is generated 174 from a range spanning the size of the number of entries in the routing cache 170. For example, if there are 20 entries then the random number (variable "new" in FIG. 9) will be between 1 and 20, for example the number 14. The random number serves as an index into the routing cache 170. That is to say, the 14th entry in the routing cache 170 is replaced 176 with the new nodeID-address pair. In the example of FIG. 9, nodeID 94857 and its network address (not shown) are replaced with new nodeID 92814 and its address (e.g., "192.168.4.20").

Figure 10:
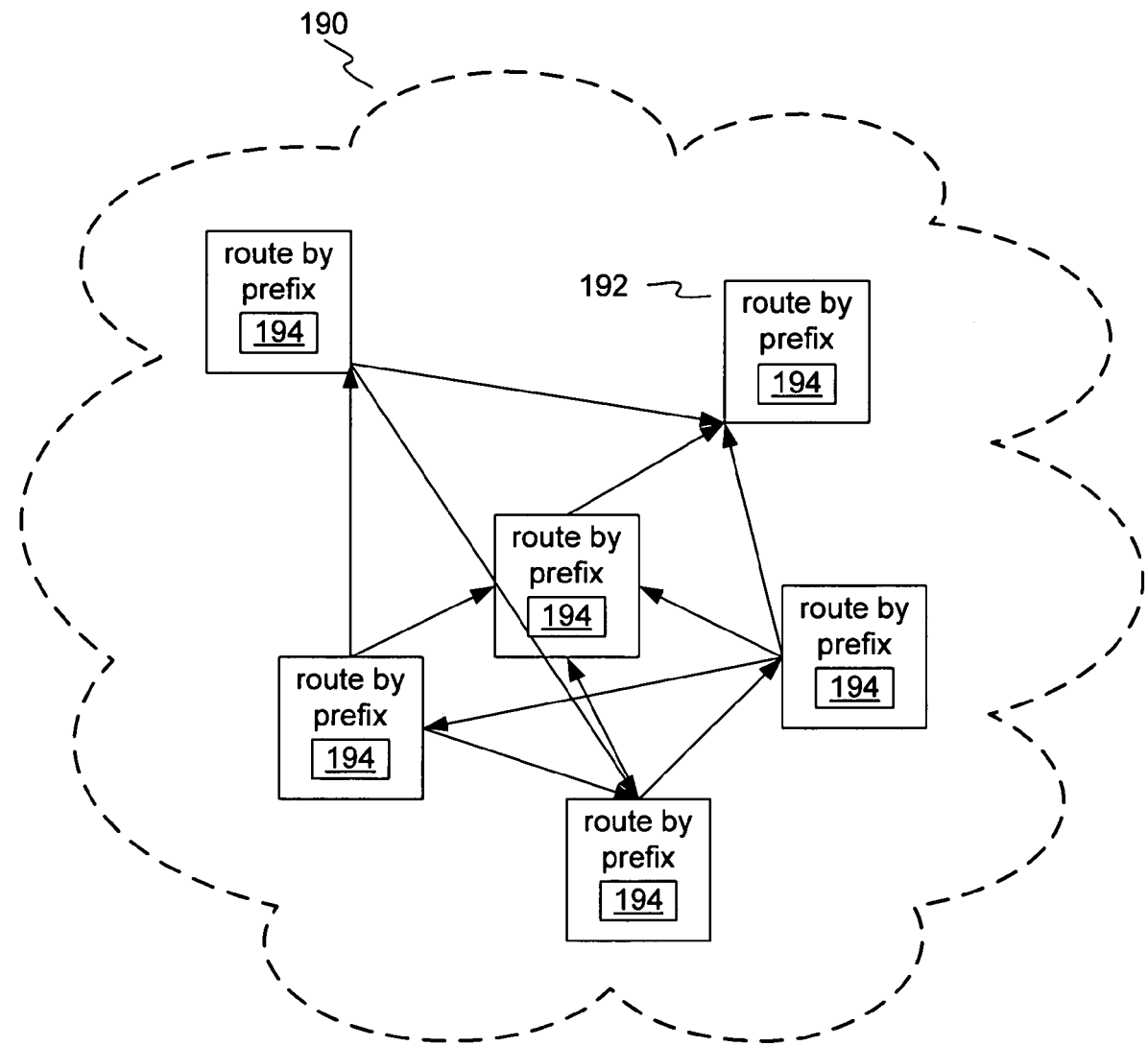
FIG. 10 shows an overlay formed by DHT nodes with unstructured routing caches.

FIG. 10 shows an overlay 190 formed by DHT nodes 192 with unstructured routing caches 194. Although difficult to depict, the topology of the overlay 190 should end up as a graph with log(N) average steps or hops to reach any member of the graph. Although the nodes have unstructured routing caches 194, they can perform prefix-based or numerical-closeness message routing as discussed earlier. Therefore, an unstructured cloud 190 layered over a data network (not shown) that routes DHT messages based on nodeID prefix matching (or other forms of numerical closeness) may be realized.

Figure 11:
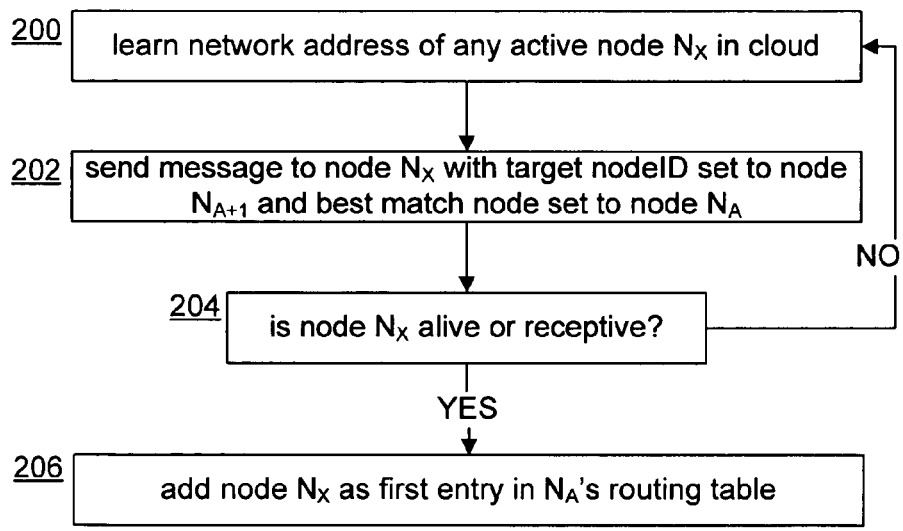
FIG. 11 shows a process for adding a node to a DHT.

FIG. 11 shows a process for adding a node to a DHT. A new node $N_A$ in a DHT must be tied into the DHT cloud. This may involve at least populating one or more entries into new node $N_A$'s routing cache. As will be seen, initialization may also involve causing the routing cache in one or more other nodes to include an entry pointing to the new node $N_A$. New node $N_A$ will have some means for learning 200 the nodeID and network address of at least one other node $N_X$ in the DHT cloud. That node $N_X$ can be any arbitrary node in the DHT cloud. The nodeID-address of node $N_X$ may be obtained from a configuration parameter, or from a seed peer or server, or from a poll of the data network, etc. The new node $N_A$ generates a new DHT message, sets the message's target key to $N_{A+1}$, and begins routing the message by sending 202 it to node $N_X$. The message may be limited to a maximum number of hops using a TTL field as discussed earlier. If node $N_X$ is not 204 alive or receptive then steps 200 and 202 are repeated and a new node $N_X$ is tried. If 204 node $N_X$ is responsive then node $N_A$ adds 206 the nodeID-address of node $N_X$ as the first entry in node $N_A$'s routing cache.

A side effect of targeting the initialization message to some perhaps distant node $N_{A+1}$ is that all of the nodes that route the initialization message can add new node $N_A$ to their routing cache. Thus, although the new node $N_A$ may initially have one entry to route into the DHT, the rest of the DHT may have greater visibility of the new node $N_A$ and may begin sending it DHT messages. As node $N_A$ continues to participate in the DHT and receives messages from other nodes that have it in their routing caches, it will continue to build populate its own routing cache with nodeID-address pairs from those messages thereby becoming a full participant in the DHT. In other words, although a freshly initialized node may be able to participate in the DHT cloud, it may not be able to add value to the DHT's message routing until it has processed several messages from other nodes, thereby growing its routing table.

Other methods of initialization may also be used. For example, a new node could copy the routing cache of another node or merge the routing caches of several other nodes.

Figure 12:
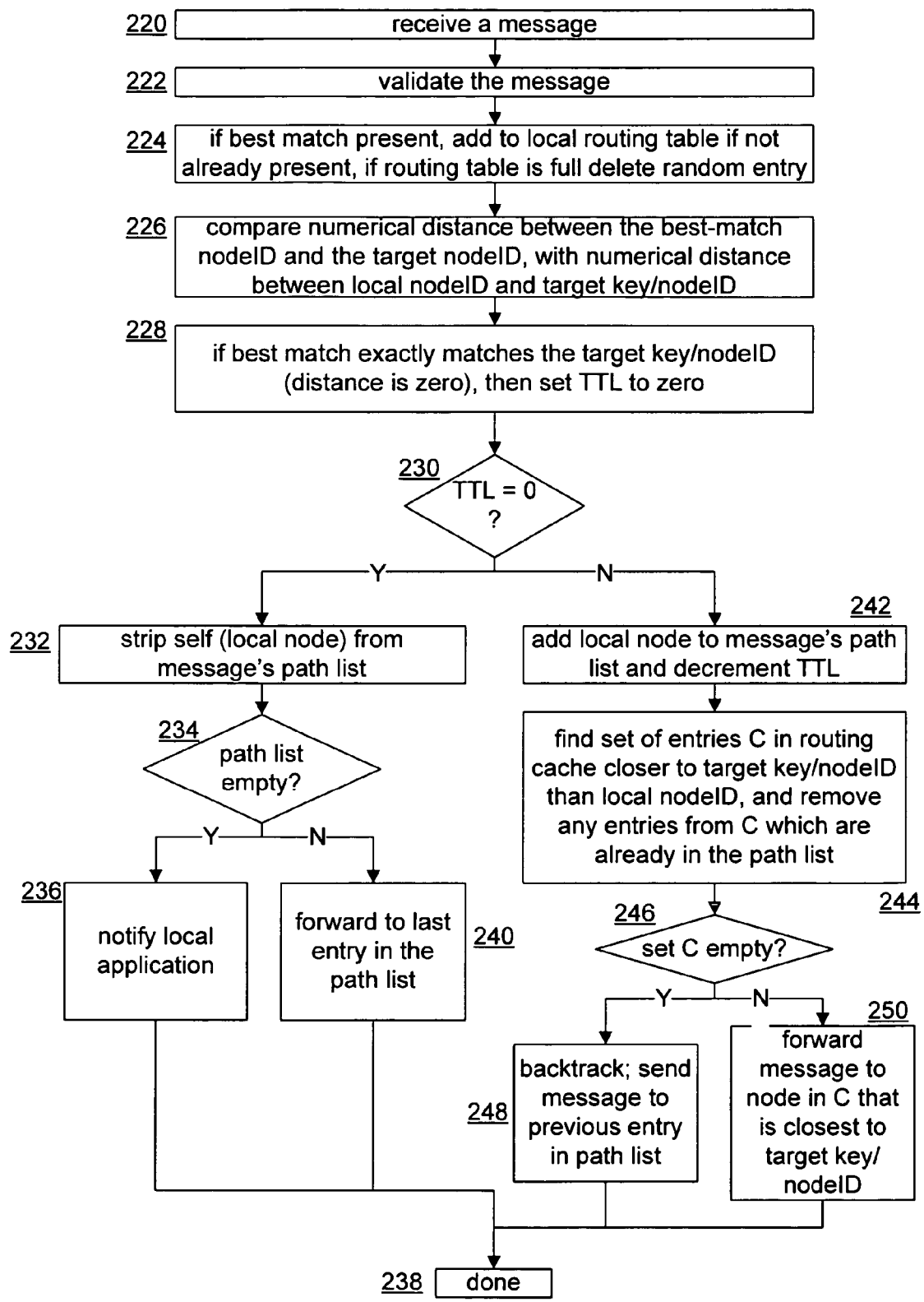
FIG. 12 shows a process for routing messages and managing a routing cache.

FIG. 12 shows a process for routing messages and managing a routing cache. This process may handle any messages, regardless of the purpose of the message (e.g., lookup, insert, delete, etc.), regardless of whether the message to be handled originated from another node or from the node performing the process, and regardless of whether the message needs to be routed to another node. Messages may be in a form similar to message 120 in FIG. 7.

When a message is first created, the originating node sets the message's target key to be equal to the destination key. In the case of an insertion, the originating node sets the payload to a value to be inserted into the DHT. The path list is set to be empty. The message is then passed to the message handling process of FIG. 12, which proceeds as follows.

The process receives 220 the message and validates 222 the message for proper format, security signatures, checksums, etc. If the message is invalid then it is discarded. Next, the process checks 224 to see if a best match nodeID is present in the validated 222 message. If the best match nodeID is present and that nodeID does not already exist in the processing node's routing cache then it is added thereto. If the routing cache is full then an existing entry is selected for replacement, where the selection is made without imposing a nodeID-based structure on the routing cache. For example, if the routing cache is full then a random entry may be replaced. Note that when adding or replacing an entry the processing node's nodeID is implicitly considered to be a member of the local routing cache.

The process of FIG. 12 then compares 226 (a) the numerical distance between the best match nodeID and the target key, with (b) the numerical distance between the local nodeID and target key. If 228 the best match nodeID exactly matches the target key (i.e., the numerical distance is zero), then the message's TTL field is set to zero.

If 230 the TTL field is zero then the local processing node strips 232 itself from the message's path list. Then, if the path list is empty 234 then the message was originated locally and the process returns a response to or otherwise notifies 236 the local application that initiated the message, and the message is done 238 being processed. Otherwise, if the path list is not empty 234 then the message is forwarded 240 via a network transmission to the network address of the node of the last remaining entry in the message's path list, after which processing of the message is done 238.

Referring again to step 230, if 230 the message's TTL is not zero (greater than zero), then the message is still being routed, the local node and its address are added 242 to the message's path list, and the message's TTL is decremented. The process then finds 244 a set of entries C in the local routing cache that are numerically closer to the message's target key than the local processing node's nodeID. Any entries from C which are already in the path list are removed from C. If the set C is empty 246 then the message needs to be routed back toward the originator, i.e., backtracked 248. To backtrack 248 the message the process sends the message to the previous entry in the message's path list using that entry's network address. Processing is then done 238. Referring again to step 246, if the set C is not empty 246 then the message is forwarded 250 to the node in C that is numerically closest to the target key, e.g., the node in C with the best prefix match to the target key.

If nodes handle messages according to the process of FIG. 12, then unless the DHT cloud is smaller than the maximum number hops or the target key exactly matches a processing nodeID, then a message propagates up to a maximum number of hops, which is the starting value of the TTL field. A number of optimizations can be used to ensure that messages propagate only until finding the correct node. However, if an exact match for a target key exists, then that node can be reached in order log(N) hops, where N is the number of nodes in the DHT.

Empirical tests have shown that message processing as discussed above can result in average routing on the order of log(N) hops without requiring the use of an intricate cache management scheme and a rigidly structured cache. Efficient routing can be achieved using a side effect of routing messages. Cache management may be thought of as being traffic-driven. In other words, as discussed above, the content of a node's routing cache may be determined by or based on the traffic that it routes in the DHT.

FIG. 13 shows some test results 260. Assuming that prefix-based routing is being used and cache entries are randomly replaced, then it can be seen that routing in the DHT is adequate. Routing performance may improve once the routing table size exceeds the typical minimum number of entries used for a prefix-matching routing table structured as in FIG. 5. Adding more entries to the routing table allows each hop to deliver the message marginally closer to the target node than a smaller table and therefore may decrease the average hop count. When the cache is sufficiently large, for example with $b*\log_b(N)$ entries (where b is the base of the nodeIDs and N is the number of nodes), delivery is very reliable and may approach an average order of $\log_b(N)$ hops. It can be seen that random or unstructured replacement, even without requiring the use of a leafset, is sufficient to enable the prefix-match type of routing.

It should be noted that although a routing cache may be randomly constructed or maintained, it may converge to some unintentional structure as a side-effect of the source of data supplied to the routing table, namely message routing.

Although unstructured or random cache management has been discussed, this approach can be used in a DHT in which some nodes user other perhaps more sophisticated management schemes. Thus, small or resource-limited computing devices may use the management schemes discussed herein to participate in a DHT in which other nodes use different cache management schemes.

Although a leafset is not required, a leafset may be used in conjunction with the embodiments discussed herein. A node's leafset is a set of nodes whose nodeIDs are closest to the nodeID of the node. If a significant number of nodes are quiet then a leafset may help to make sure they are discoverable. Furthermore, although not required, a watchdog mechanism can be used, with or without a leafset, to avoid stale cache entries. A watchdog mechanism involves some nodes polling to make sure that other nodes are still participating in the DHT.

Typically, 100 to 200 cache entries will usually suffice for DHT's with hundreds of millions of nodes, although a precise cache size is not important.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like. Furthermore, those skilled in the art will also appreciate that no further explanation is needed for embodiments discussed to be implemented on devices other than computers. Devices such as appliances, televisions, portable media players, or any device with a display and a need to control an audio signal can be readily designed with features discussed above.

All of the embodiments and features discussed above can be realized in the form of information stored in volatile or non-volatile computer readable medium. This is deemed to include at least media such as CD-ROM, magnetic media, flash ROM, etc., storing machine executable instructions, or source code, or any other information that can be used to enable a computing device to perform the various embodiments. This is also deemed to include at least volatile memory such as RAM storing information such as CPU instructions during execution of a program carrying out an embodiment.

Those skilled in the art will also realize that a variety of well-known types of computing device (or devices with network and computational ability) can serve as a DHT node. For example servers, workstations, personal computers, PDAs, mobile devices, network devices, routers, gateways, and so on. A node in a DHT node can take the form of any type of computing device. Such systems and their typical components including CPUs, memory, storage devices, network interfaces, operating systems, application programs, etc. are well known and detailed description thereof is unnecessary and omitted. A DHT can operate using any type of data network, such as an IP network, a telephony signaling network, a wireless or cell network, or others.

The invention claimed is:

1. A method of managing a routing table that a node uses to route distributed hash table (DHT) query messages in a DHT that is distributed among nodes, including the node, on a data network, where each of the nodes has an assigned node identifier (nodeID) and an address on the data network, wherein the routing table comprises entries, and wherein an entry comprises a node's nodeID and network address, the method comprising:

receiving the DHT query messages from others of the nodes, wherein a DHT query message comprises a target key and one or more nodeID-network address pairings of one or more nodes that previously sent the DHT query message via the data network;

selecting entries in the routing table based on numerical closeness of the entries' nodeIDs to the target key and using the network addresses of the selected entries to route the DHT query messages to the nodes corresponding to the selected entries; and maintaining the routing table by placing nodeID-address pairings therein without structuring the routing table according to the nodeIDs placed therein, wherein the nodeID-address pairings are from the received DHT query messages, the method being performed by at least one of the nodes.

2. A method according to claim 1, wherein the placing comprises replacing entries in the routing table, where the entries to be replaced are determined without regard for their nodeIDs.

3. A method according to claim 1, wherein the nodeID-address pairings placed in the routing table are randomly placed within the routing table.

4. A method according to claim 1, wherein the placing comprises replacing entries in the routing table, where the entries to be replaced are determined without regard for numerical closeness of their nodeIDs to the nodeID of the node maintaining the routing table.

5. A method according to claim 1, wherein the nodeID-address pairings placed in the routing table are placed in the routing table without regard for their nodeIDs.

6. A method according to claim 1, wherein the selecting entries in the routing table based on numerical closeness of the entries' nodeIDs to the target key comprises comparing prefixes of the target key with prefixes of entry nodeIDs.

7. A method of managing a routing cache utilized in routing distributed hash table (DHT) routing messages regarding a DHT that is distributed across a network, the method comprising:
replacing cache entries in the routing cache with node identifiers (nodeIDs) and corresponding network addresses obtained from the DHT routing messages being routed within the distributed hash table, wherein the cache entries are replaced such that the routing cache has a substantially random distribution of nodeIDs, and by placing the nodeIDs and corresponding network addresses as pairs in the routing cache without structuring the routing cache according to the nodeIDs placed therein, the method being performed by a node on the network.

8. A method according to claim 7, wherein the replaced cache entries are replaced without regard for the nodeIDs therein.

9. A method according to claim 7, wherein the cache entries are replaced without regard for the nodeIDs with which they are replaced.

10. A method according to claim 7, wherein routing cache is not structured according to the nodeIDs therein.

11. A method according to claim 7, further comprising routing the DHT routing messages within the distributed hash table by comparing prefixes of destination keys in the DHT routing messages with prefixes of nodeIDs in the routing cache.

12. A volatile or non-volatile computer-readable medium storing computer executable instructions for enabling a computing device to perform a method according to claim 7.

13. A method according to claim 7, wherein cache entries are randomly selected for replacement.

14. A computing device comprising:
a portion of a distributed hash table (DHT);
a routing table utilized in routing DHT queries regarding the distributed hash table, wherein the routing table is utilized to link the computing device to an overlay network of nodes participating in the distributed hash table via a data network, where the overlay network is layered above the data network; and
a routing unit operable to route the DHT queries by selecting node identifiers (nodeIDs) in the routing table based on their numerical closeness to nodeIDs in the routing queries; and
a routing table management unit operable to manage the routing table, the managing including replacing table entries without structuring the routing table based on nodeIDs placed therein, wherein the nodeIDs and corresponding network addresses placed in the routing table are obtained from the DHT queries.

15. A computing device according to claim 14, wherein a substantial portion of the replaced table entries are randomly selected for replacement.

16. A computing device according to claim 14, wherein the routing table is maintained with a substantially random distribution of nodeIDs.

17. A computing device according to claim 14, wherein the table entries are replaced without regard for numerical closeness of a nodeID of the computing device to nodeIDs being placed or replaced in the routing table.

18. A computing device according to claim 14, wherein the routing unit routes the DHT queries to nodes with entries in the routing table whose nodeIDs are numerically closest to keys to which the DHT queries are directed.

* * * * *